(12) United States Patent  
Lulay

(10) Patent No.: US 7,121,565 B2  
(45) Date of Patent: Oct. 17, 2006

(54) WHEELBARROW EASY DUMPING HANDLE APPARATUS

(76) Inventor: Melvin F. Lulay, P.O. Box 1720, Waldport, OR (US) 97394

( * ) Notice: Subject to any disclaimer, the term of this patent is extended or adjusted under 35 U.S.C. 154(b) by 304 days.

(21) Appl. No.: 10/922,838

(22) Filed: Aug. 23, 2004

(65) Prior Publication Data

US 2005/0104310 A1    May 19, 2005

Related U.S. Application Data

(60) Provisional application No. 60/520,158, filed on Nov. 14, 2003.

(51) Int. Cl.
*B62B 1/18* (2006.01)

(52) U.S. Cl. .............................. 280/47.315; 280/47.31; 16/900

(58) Field of Classification Search ........... 280/47.315, 280/47.131, 47.24, 47.26, 43.1, 659, 651–655, 280/47.12, 47.17, 47.31, 47.36, 47.37; 16/427, 16/429, 900, 422, 430; 294/167–169, 57–59
See application file for complete search history.

(56) References Cited

U.S. PATENT DOCUMENTS

| | | | | |
|---|---|---|---|---|
| 2,901,263 A | * | 8/1959 | Van Loon, Jr. | 280/47.31 |
| 3,173,705 A | * | 3/1965 | Du Puy | 280/47.31 |
| 4,951,956 A | * | 8/1990 | Vittone | 280/47.31 |
| 5,153,966 A | * | 10/1992 | Godwin | 16/421 |
| D632,100 | * | 9/1995 | McMurdo | D34/27 |
| 5,810,375 A | * | 9/1998 | Hoffarth et al. | 280/47.31 |
| 6,550,104 B1 | * | 4/2003 | Cacciacarne | 16/426 |

* cited by examiner

*Primary Examiner*—Christopher P. Ellis
*Assistant Examiner*—Vaughn Coolman
(74) *Attorney, Agent, or Firm*—Gene W. Arant

(57) ABSTRACT

A wheelbarrow handle accessory has a tube member that slides over the end of a wheelbarrow handle, and a hand grip assembly including a partial sleeve that normally rests upon the tube member in aligned relationship, the hand grip assembly being rotatably supported from the tube member.

7 Claims, 5 Drawing Sheets

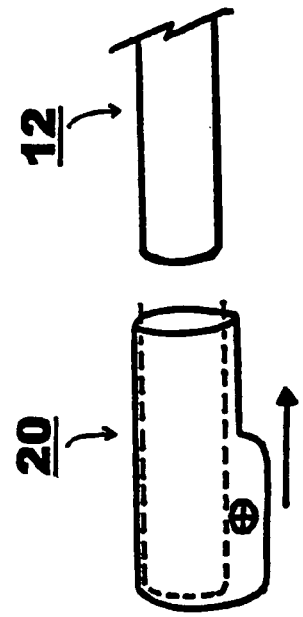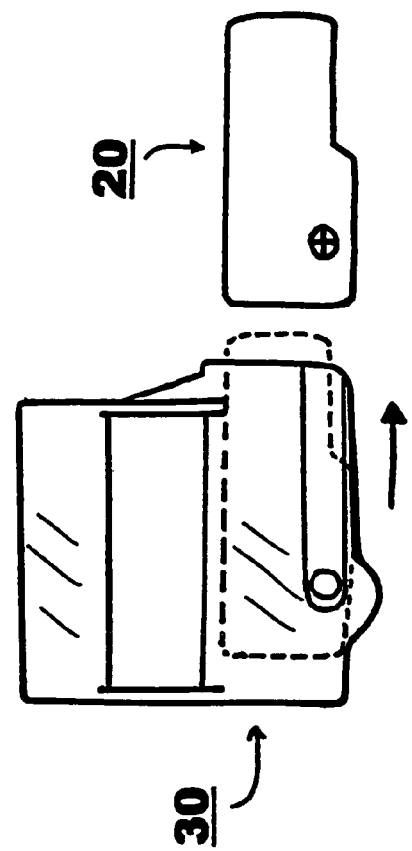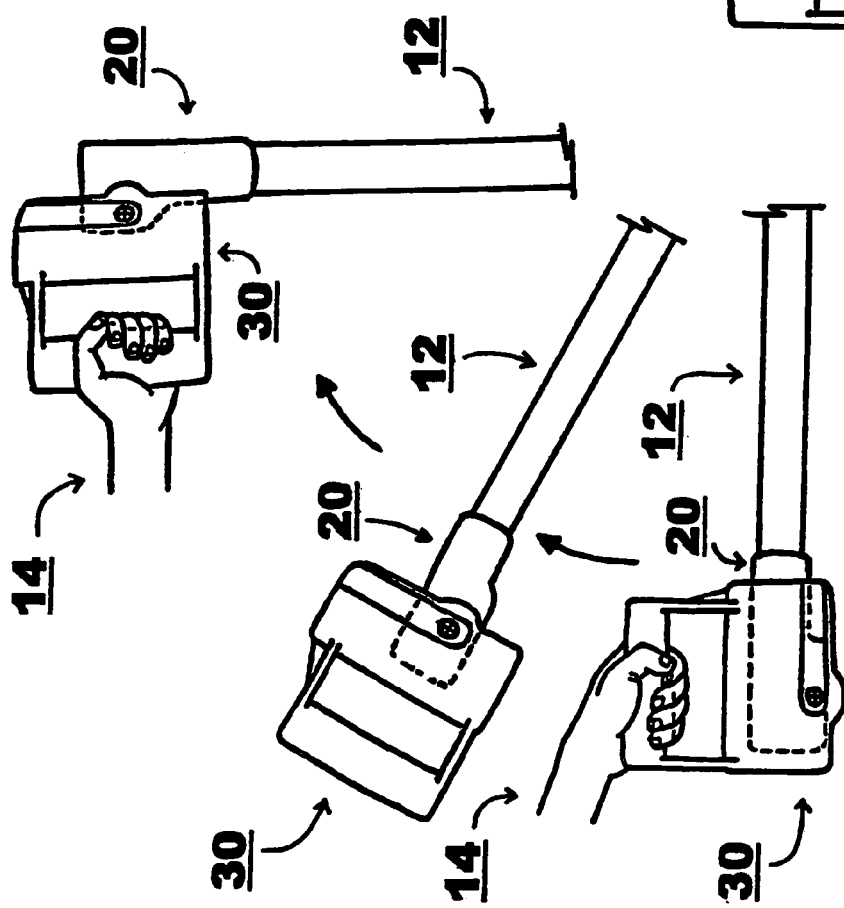

WHEELBARROW EASY DUMPING HANDLE APPARATUS

PRIORITY CLAIM

This application claims the priority of my U.S. Provisional application Ser. No. 60/520,158 filed Nov. 14, 2003.

FIELD OF THE INVENTION

The field of this invention is hand operated apparatus such as wheelbarrows.

PRIOR ART

Prior art includes U.S. Pat. No. 3,173,705 issued Mar. 16, 1965.

BACKGROUND OF THE INVENTION

The standard wheelbarrow has a wheel at the forward end to carry the load and a pair of generally parallel handles that project rearwardly to be grasped by the hands of the person using the wheelbarrow. A very difficult problem arises when it is necessary to empty a very heavy load, such as wet concrete, in a desired location. The operator when lifting the handles has to maintain a tight grip on them to prevent the load from spilling sidewise. At the same time it becomes increasingly difficult to manipulate the handles when they start to assume a more nearly vertical position, which they must do in order to empty the load.

Not only is it very difficult to empty such a heavy load from the wheelbarrow, but the person doing it may have to change the position of their hands on the wheelbarrow handle, or alternatively must twist his or her hands through as much as 180 degrees of rotation in order to empty the load. In that twisting action the person may suffer the serious injury that is known as repetitive-motion or carpel tunnel syndrome injury. Or if the person's hands are removed and then engaged in a different position on the handle of the wheelbarrow, there is a risk of spilling the load in the wrong location.

SUMMARY OF THE INVENTION

According to the invention I provide a pair of accessories which are conveniently attached to the wheelbarrow handles to make the dumping operation easy for the operator. Each accessory includes a tube member or adapter that slides over an end portion of the wheelbarrow handle, and a hand grip assembly that is rotatably secured to the tube member or adapter. While the wheelbarrow is being moved from one location to another the operator holds the two hand grips in a horizontal position, supporting the wheelbarrow handles from above. Then, when the load is to be dumped, the operator simply raises the hand grips and handles and rotates the hand grips by as much as 180 degrees so that they will then assume positions underneath the wheelbarrow handles, and the load can be dumped from the front end of the wheelbarrow at exactly the desired location.

More specifically, according to the presently preferred form of my invention my accessory includes a tube member adapted to slide longitudinally onto an end of a wheelbarrow handle. The tube member has a pair of flanges formed along a portion of its length which also extend downwardly in parallel relation, and has ears that protrude outwardly from the flanges in aligned relationship. The hand grip assembly includes a partial sleeve for engaging and normally resting upon the upper half of the tube member, and a generally straight hand grip member arranged in parallel to and spaced from the partial sleeve. The partial sleeve also has parallel walls which extend downwardly below the upper half of the tube member, and which have longitudinal grooves extending inward from one of its ends. When the parts are assembled together the ears of the tube member slide into and along the grooves, and then snap into aligned openings formed at the ends of the grooves of the partial sleeve to securely and permanently lock the two parts together in relatively rotatable relationship.

DRAWING SUMMARY

FIG. 1 illustrates my novel wheelbarrow handle accessory and positions of the operator's hand both when the wheelbarrow is carrying a load and when the load is being dumped;

FIG. 2 shows how my novel tube member, if a separate part, would slidably fit onto the wheelbarrow handle;

FIG. 3 illustrates how the ears of my tube member are inserted into the grooves of the hand grip member and then snappingly engaged with holes in the hand grip member to secure the two parts together;

DETAILED DESCRIPTION

Figure 4:
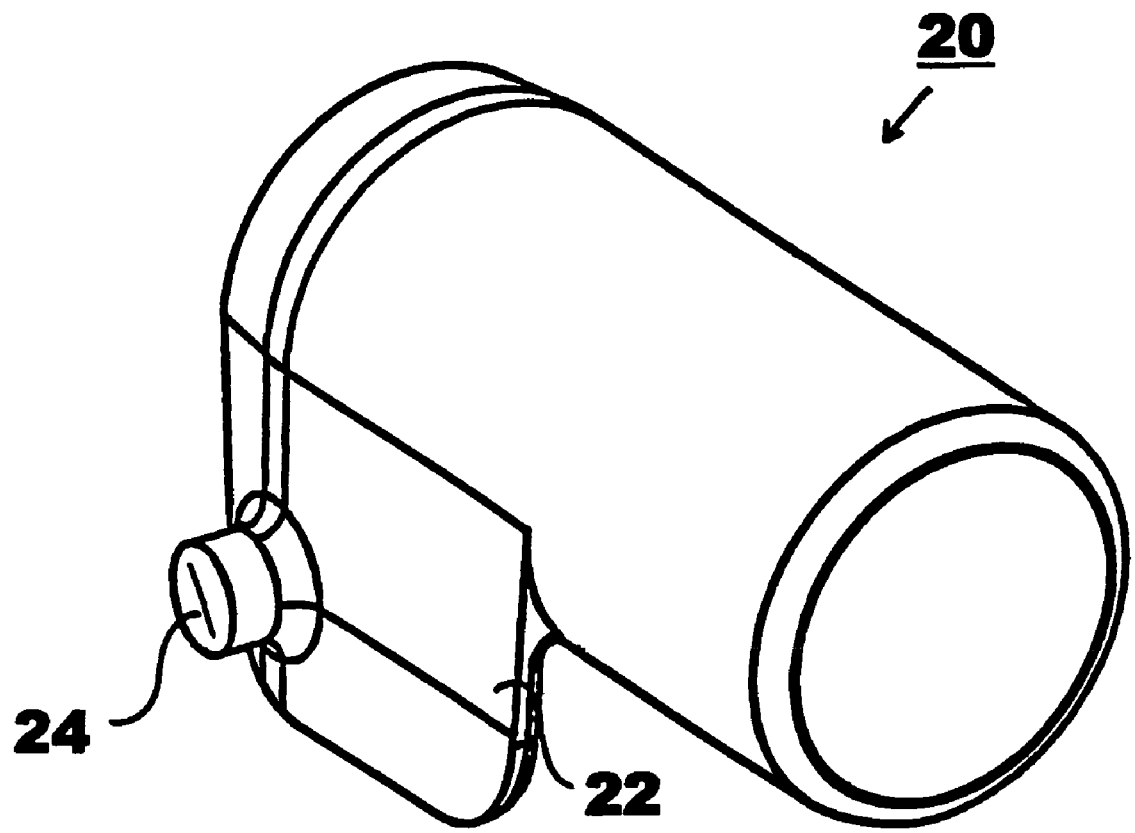
FIG. 4 is a perspective view of my tube member.
Figure 5:
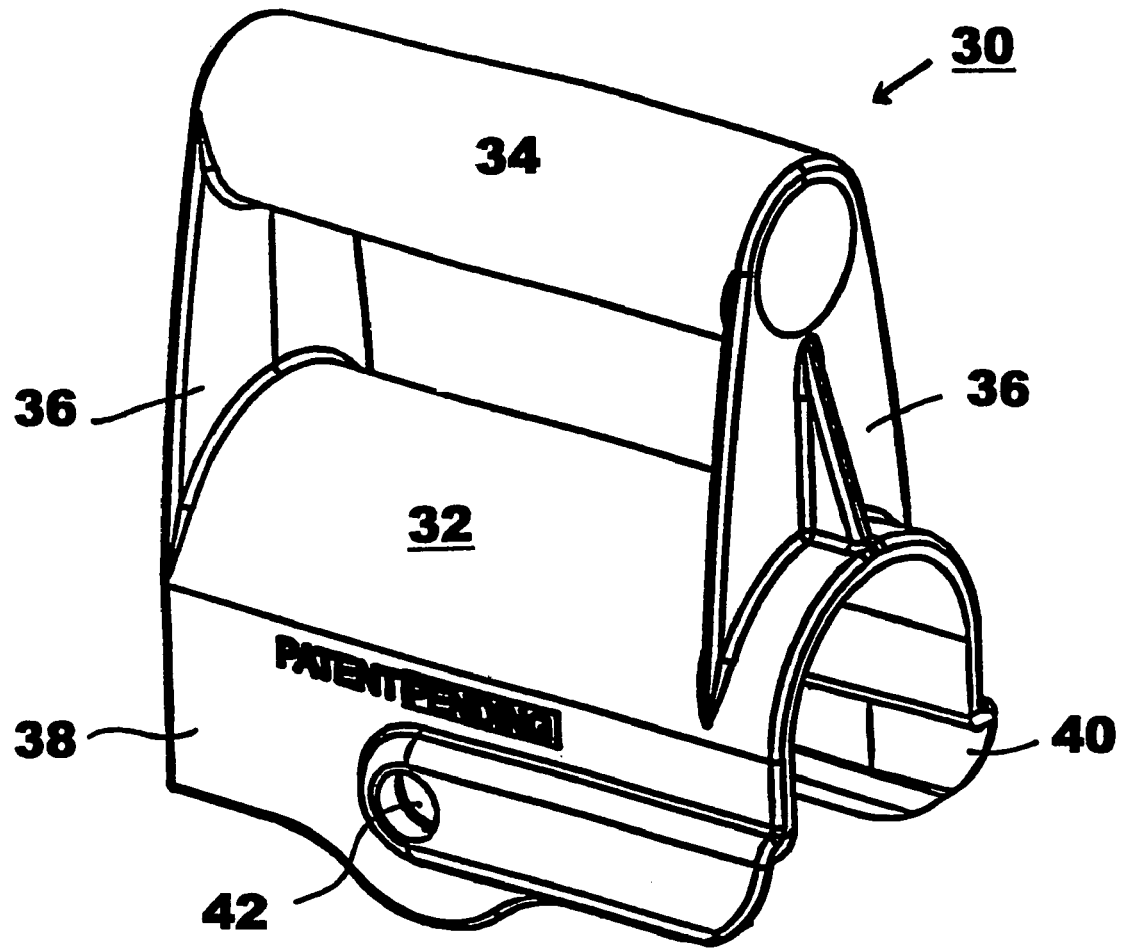
FIG. 5 is a perspective view of my novel hand grip assembly viewed from above.
Figure 6:
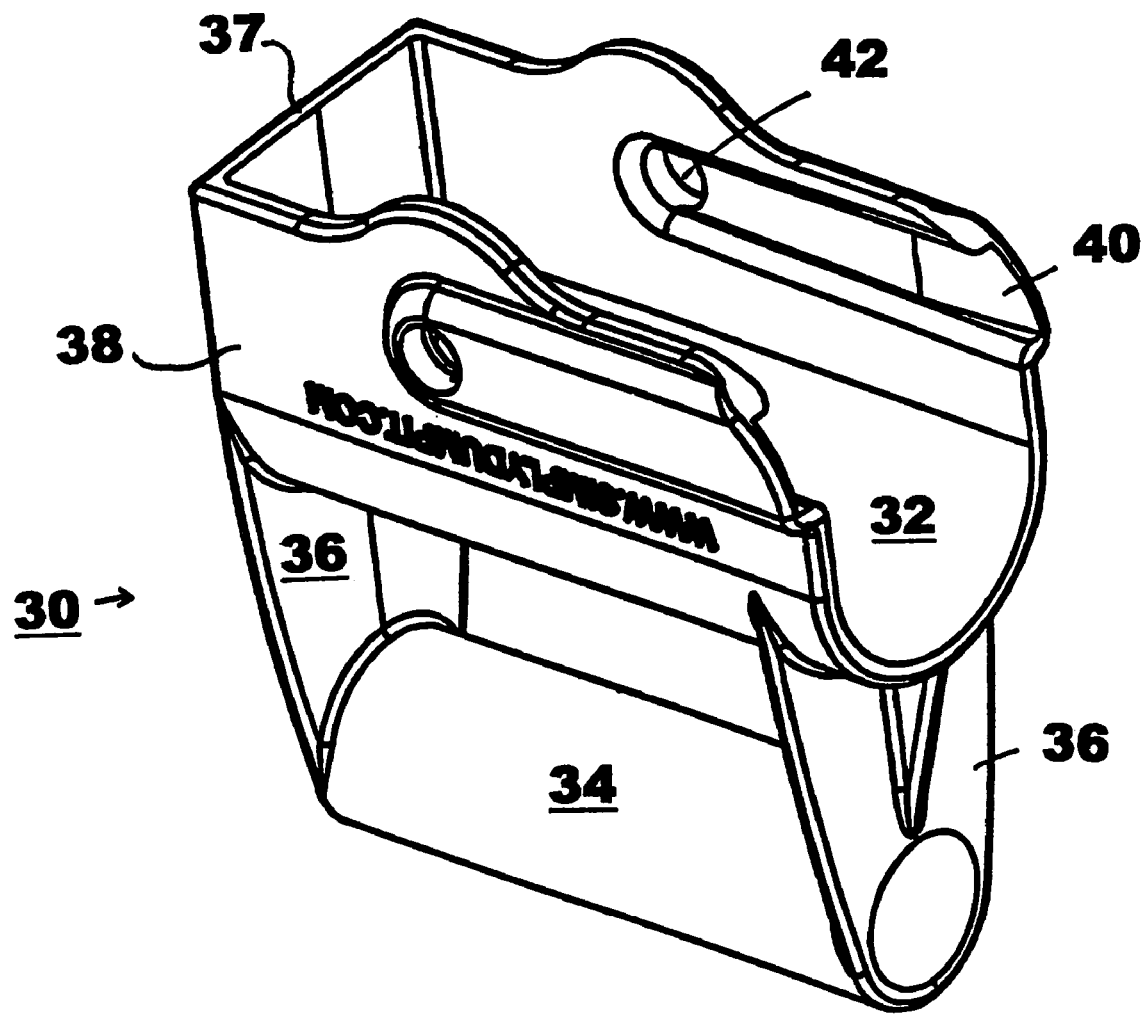
FIG. 6 is an upside-down perspective view of my hand grip assembly.
Figure 7:
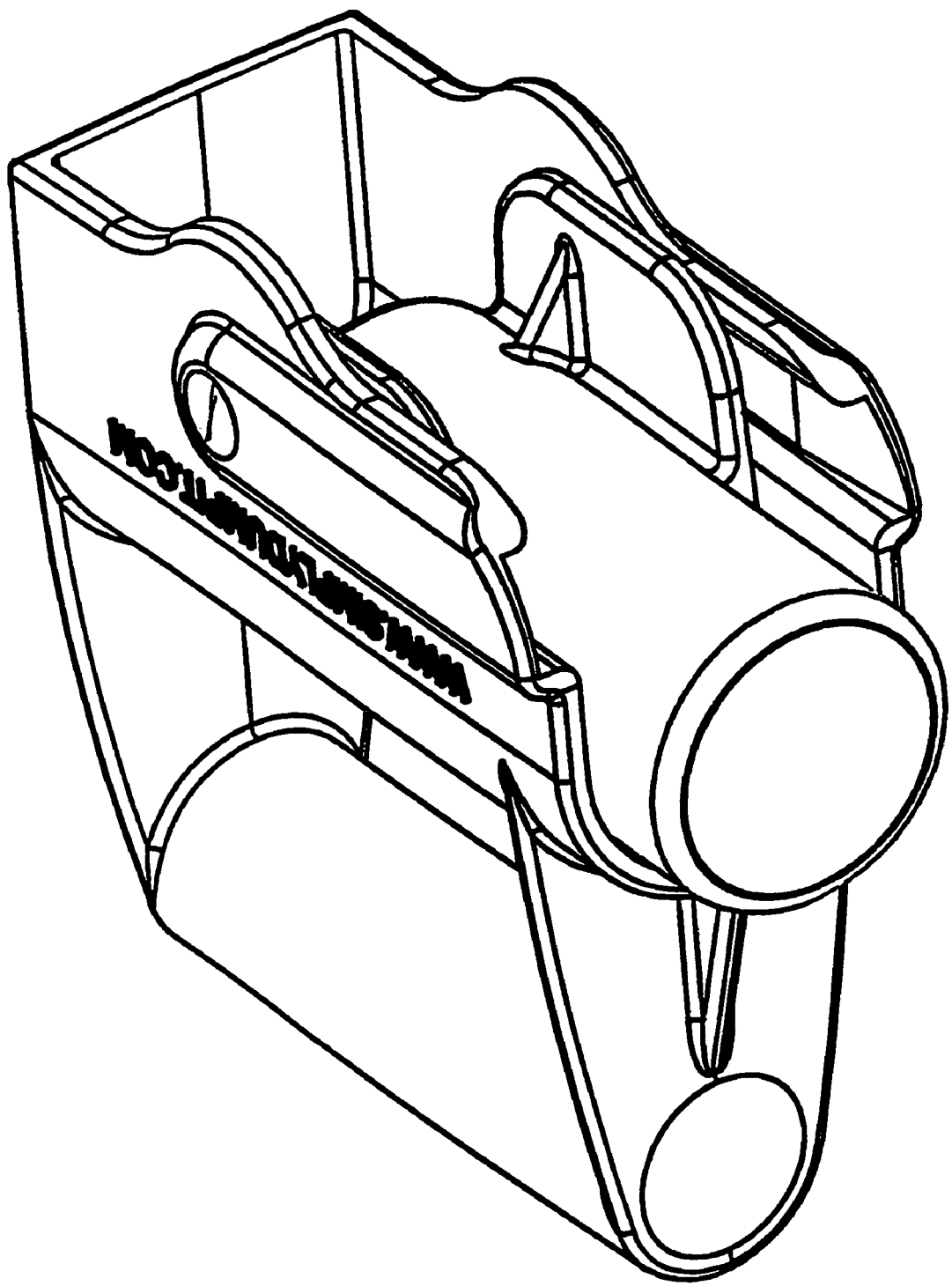
FIG. 7 is a perspective upside-down view showing how my adapter or tube member is inserted into its locking position in the hand grip member.

FIGS. 1 Through 7

Referring now to the drawings, in FIG. 1 the wheelbarrow handle is designated as 12 and the operator's hand as 14. FIG. 1 shows in solid lines the position of my wheelbarrow handle accessory 10 when the wheelbarrow is carrying a load. When a load is being transported the operator's hand grasps the hand grip 34 of my accessory 10 from above, which then supports handle 12 from above. The solid arrow 16 indicates an upward movement of the handle 12 when the load is to be dumped. FIG. 1 also shows in dotted lines the changes in position as the load is being dumped. As indicated by dotted arrow 18 the accessory 10 is rotated down and back through an angle of as much as 180 degrees, and the operator's hand is then underneath the hand grip 34. But the operator does not have to remove their hands from the hand grips while the load is being dumped.

FIG. 2 shows how my novel tube member 20, if it were a separate part, would slidably fit onto the wheelbarrow handle 12. End stop 26 limits the extent to which the tube member slides over handle 12. The fact is that tube member 20 is a separate part only when it is first produced by the injection molding die. It is then inserted into and locked to hand grip assembly 30 as schematically illustrated in FIG. 3. The pegs or ears 24 of the tube member 20 are inserted into the grooves 40 of the hand grip assembly 30. The pegs 24 slide to the ends of grooves 40 and are then snappingly engaged with holes 42 in the hand grip member to securely lock the two parts together in rotatable relationship.

Tube member 20 is adapted to slide longitudinally onto the wheelbarrow handle 12 in a close-fitting relationship.

The tube member 20 has a pair of flanges 22 formed along a portion of its length which also extend downwardly in parallel relation. A pair of ears 24 protruding outwardly from respective flanges 22 in aligned relationship.

Hand grip assembly 30 has a partial sleeve 32 for engaging the tube member 20 in circumdisposed relation to the upper half of the tube. An elongated generally straight hand grip member 34 is disposed above to the partial sleeve. It is supported by end walls 36 at its two ends in spaced parallel relationship to the partial sleeve 32. All portions of the hand grip assembly 30 are preferably integrally cast as a single part.

Partial sleeve 32 also has downwardly extending parallel side walls 38. Elongated grooves 40 are formed in the inner surfaces of the side walls 38. When the tube member 20 is inserted into the partial sleeve 32 the pegs or ears 24 of the tube member are slidingly received in the grooves. The partial sleeve 32 also has aligned openings or holes 42 at the ends of grooves 40 which are adapted to be snappingly engaged by the ears 24 of the tube member when the tube is assembled to the partial sleeve.

The parallel side walls of the partial sleeve 32 rather tightly engage the sides of the tube member 20 so as at all times to maintain alignment of the hand grip assembly in a vertical plane above the tube member. The partial sleeve 32 acts as a first stop means to limit forward rotating movement of the hand grip assembly relative to the tube member 20. The rearward end of partial sleeve member 32 is closed off at 37 by an extension of end wall 36, to act as a second stop means to limit the rearward rotating movement of the hand grip assembly 30 relative to the tube member 20. The two stop means together allow hand grip assembly 30 to rotate nearly 180 degrees relative to the tube member 20, as shown in FIG. 1.

My product is preferably made by injection molding using fiber glass reinforced nylon material. Other types of plastic material may also be used. The grooves 40 in the inner surfaces of side walls 38 of the hand grip assembly 30 are preferably tapered throughout their length to ease the insertion of the tube member ears. Also, the pegs or ears 24 are preferably tapered on one side, so that the side or edge that initially enters the grooves 40 will fit more easily. When the tube member 20 and hand grip assembly 30 first come out of their respective injection molding dies they are preferably snapped together when both are still hot and hence somewhat flexible.

The method of use of my product is generally shown in FIG. 1, which shows in dotted lines the changes in position of hand grip assembly 30 as the load is being dumped. As indicated by dotted arrow 18 the accessory 10 is rotated down and back through an angle of as much as 180 degrees, and the operator's hand is then underneath the hand grip 34. But the operator does not have to remove their hands from the hand grips while the load is being dumped. The large rotational movement of the hand grip assembly 30 relative to tube member 20 is made possible by the fact that the axis of rotation defined by pegs or ears 24 and holes 42 is essentially at the rearward end of tube member 20.

My invention may also be used in ways other than as specifically illustrated. For example, suitable pivot support means may be incorporated into a standard wheelbarrow handle and my hand grip assembly modified accordingly. Also, my hand grip assembly may be supported by a supporting base other than either a wheelbarrow handle or the illustrated tube member. Further, the entire assembly as illustrated may be used for a different purpose, such as to support a flashlight that may be received within the tube member and adjusted at a desired angle.

The presently preferred embodiment of my invention has been disclosed in detail in order to comply with requirements of the patent laws. It will be understood, however, that other modifications and variations will be understood by persons who are skilled in the art, and that the scope of my invention is to be judged only in accordance with the appended claims.

PARTS LIST 10 accessory
12 wheelbarrow handle
14 hand of operator
16 solid arrow
18 dotted arrow
20 tube member
22 flanges
24 ears
26 end stop
30 hand grip assembly
32 partial sleeve
34 hand grip
36 end walls
37 downward extension of one end wall 36
38 side walls
40 grooves
42 holes for ears

The invention claimed is:

1. A wheelbarrow handle accessory apparatus to facilitate easy dumping of a load from a wheelbarrow, the accessory apparatus comprising:

a tube member adapted to slide longitudinally onto the wheelbarrow handle, the tube member having a pair of flanges formed along a portion of its length which also extend downwardly in parallel relation, and having a pair of aligned ears protruding outwardly from respective flanges;

a hand grip assembly including a partial sleeve for engaging the tube member in circumdisposed relation to the upper half of the tube, an elongated generally straight hand grip member disposed parallel to the partial sleeve, and end walls supporting the hand grip at its two ends in spaced relation to the partial sleeve;

the partial sleeve also having downwardly extending parallel side walls with elongated grooves therein which are adapted to slidingly receive the ears of the tube; and the partial sleeve further having aligned openings therein at the ends of the grooves which are adapted to be snappingly engaged by the ears of the tube when the tube is assembled to the sleeve.

2. The apparatus of claim 1 wherein both the hand grip assembly and the tube are made of a plastic material.

3. A wheelbarrow handle accessory comprising:

a tube member adapted to slide longitudinally onto an end of a wheelbarrow handle, the tube member having a pair of flanges formed along a portion of its length which also extend downwardly in parallel relation;

a hand grip assembly including a partial sleeve for engaging and normally resting upon the upper half of the tube, and a generally straight hand grip member arranged in parallel to the partial sleeve and supported from it in spaced relation;

the partial sleeve also having parallel side walls which extend downwardly below the upper half of the tube; and pivot means rotatably securing the parallel side walls of the partial sleeve to the respective flanges of the tube member;

the hand grip assembly being rotatable essentially 180 degrees relative to the tube member, such that while the wheelbarrow is being moved from one location to another the operator may hold a pair of such hand grips in a horizontal position supporting the wheelbarrow handles from above, and then when the load is to be dumped may raise the hand grips and handles and rotate the hand grips by as much as 180 degrees so that they will then assume positions underneath the wheelbarrow handles.

4. The apparatus of claim 3 wherein both the tube member and the hand grip assembly are made of plastic material.

5. The apparatus of claim 3 wherein the respective flanges of the tube member have a pair of aligned ears protruding outwardly therefrom, the partial sleeve has elongated grooves formed in its downwardly extending parallel side walls, and the partial sleeve further having aligned openings therein at the ends of the grooves which are adapted to be snappingly engaged by the ears of the tube when the tube is assembled to the sleeve.

6. The apparatus of claim 3 wherein the parallel side walls of the partial sleeve rather tightly engage the sides of the tube member so as to maintain alignment of the hand grip assembly in a vertical plane above the tube member.

7. The apparatus of claim 3 wherein the hand grip assembly has a first stop means to limit its forward rotating movement relative to the tube member, and a second stop means to limit its rearward rotating movement relative to the tube member, the two stop means together allowing the hand grip assembly to rotate nearly 180 degrees relative to the tube member.

* * * * *